United States Patent [19]
Noble et al.

[11] 3,856,406
[45] Dec. 24, 1974

[54] HETERODYNE LASER ABSORPTION SPECTROMETER

[75] Inventors: Milton L. Noble, Pennellville; Lawrence R. Snowman, Liverpool, both of N.Y.

[73] Assignee: General Electric Company, Syracuse, N.Y.

[22] Filed: Nov. 23, 1973

[21] Appl. No.: 418,389

[52] U.S. Cl............. 356/106 S, 250/339, 250/343, 331/94.5 R, 356/51, 356/97, 356/205
[51] Int. Cl....... G01b 9/02, G01n 21/34, G01j 3/42
[58] Field of Search....... 356/51, 74, 96, 97, 106 IS, 356/204, 205; 331/94.5 R; 250/339, 343

[56] References Cited
UNITED STATES PATENTS
3,766,380    10/1973    Menzies................................ 356/51

*Primary Examiner*—Vincent P. McGraw
*Attorney, Agent, or Firm*—Richard V. Lang; Carl W. Baker; Frank L. Neuhauser

[57] ABSTRACT

A laser absorption spectrometer having enhanced spectral resolution and applicable to air pollution monitoring is disclosed. It employs a noble gas medium electronically pumped and providing simultaneous radiation on a plurality of spectral lines. The medium, each of whose lines are Doppler broadened, is installed in an optical cavity supporting plural modes within each broadened line. One reflective end wall of the cavity is driven in a sawtooth manner so as to produce a linear variation in the frequency of each resonant mode in an amount proportional to the frequency of the mode. The frequency modulated laser output is then divided into an undelayed reference portion which by passage through the gaseous sample being measured is delayed by an amount sufficient to produce substantial frequency differences. The two portions of the beam are then superimposed on a radiation detector which produces a heterodyne corresponding to the frequency differences for each line. The heterodyne frequencies may be set at a value convenient for separation by electrical filters. The technique produces simultaneous measurements of enhanced resolution at selected segments of the IR absorption spectrum for characterizing an unknown gas sample.

3 Claims, 5 Drawing Figures

Patented Dec. 24, 1974

3,856,406

HETERODYNE LASER ABSORPTION SPECTROMETER

BACKGROUND OF THE INVENTION

1. Field of the Invention

The present invention relates to spectrometric apparatus having an infrared source and designed to identify a gas by measurement of its infrared absorptive properties. The invention also relates to spectrometric apparatus employing laser light sources, such as noble gas lasers, which "lase" simultaneously on a plurality of spectral lines.

The invention further relates to apparatus for the separation of closely spaced infrared waves, using a heterodyning process giving rise to lower radio frequency terms which may be separated by electrical filters.

2. Description of the Prior Art

Gases exhibit a selective absorption property in the infrared region which is indicative of their presence and concentration. This selective absorption may be measured using infrared sources and infrared detectors. In some cases, an unambiguous identification of a gaseous sample may be achieved. In many cases, interferents may be present which mask a critical response. If a large number of unknowns are present in the sample, the identification may be either impractical or impossible with a particular equipment. Each identification problem is normally assumed to be resolvable in principle, if additional discriminatory data such as that provided by more discriminating equipment is available.

Since gas absorption phenomena are intrinsically complex, increasing the equipment resolution, sensitivity and versatility have been important design objectives. One approach has been to use broadband sources. With equipment of sufficient resolution much of the fine and hyperfine portions of the infrared spectrum of a gas may be reproduced. In a known recording spectrophotometer, using a broadband source, and using prismatic and grating techniques, a resolution of less than a wave number has been achieved. The spectral resolution is still many orders of magnitude broader than the actual detail available in the absorption spectrum of the sample. Thus, while specific absorption points may be detectable, the readings often have little quantitative significance. The process of obtaining the data is slow also, since the spectrum is charted one point at a time in a continuous manner. The technique tends to be insensitive, due to limitations on the amount of actinic energy available on any specific wavelength from the broadband light source and due to the difficulty in avoiding losses due to the spreading of the beam as it passes long distances through the sample. If conditions are changing rapidly, then the readings may differ from moment to moment from a standard value and further preclude accurate analysis. When these problems predominate, as for instance, in atmospheric studies, monochromatic sources, such as lasers have been employed.

Lasers avoid many of the foregoing problems but tend to be restricted in their output spectrum. Thus, the narrowness of a laser line is comparable to the detail to be found in absorption spectra, permitting a more accurate quantitative analysis when there is a coincidence between a laser line and an absorption line in the sample. The beam of a laser is more highly collimated than beams from broadband light sources, permitting the beam to be directed through large cross-sections of gaseous materials without losses due to imperfect collimation. Furthermore, on any specific frequency, the laser power output is high, permitting the readings to be taken with relatively high signal to noise ratios. The foregoing advantages of a conventional, single frequency laser are offset by the restriction of the conventional laser to signal frequency operation.

Lasers having greater frequency versatility are known. It is known that gases normally have more than one line at which lasing may occur. To make use of a plurality of these lines, a tunable optical cavity has been provided, designed to favor lasing on one selected line after another while precluding lasing on other lines at the same time. When used for spectrometric measurement, the retuning processing takes time, however, permitting the measured conditions to change in the process of measurement and error to enter the readings. Noble gas lasers, which have the capability of lasing simultaneously on a plurality of frequencies in a given optical cavity are also known. Should an adequate number of lines be available, and should one solve the problem of efficient simultaneous detection of plural lines, essentially all of the disadvantages noted above would be mitigated.

SUMMARY OF THE INVENTION

An object of the present invention is to provide an improved laser absorption spectrometer.

It is another object of the present invention to provide a gas absorption spectrometer employing a noble gas laser and capable of simultaneous operation on a plurality of wavelengths.

These and other objects of the invention are achieved in a heterodyne laser absorption spectrometer comprising a laser having a gaseous medium capable of optical amplification at a plurality of optical frequencies, each line being subject to Doppler broadening; having an optically resonant cavity supporting multimode operation within said broadened lines, and further including means for frequency modulating the laser output in a linear sawtooth manner by changing the resonant frequency of the cavity to produce mode pulling to displace the frequency of each laser line by an amount inversely proportional to its wavelength. Means are further provided to separate the output beam of the laser into a first and a second beam pursuing separate paths and to recombine the beams with sufficient mutual time delay to produce electrically resolvable frequency differences for individual lines. An optical detector is provided upon which the separate beams then inpinge, having a bandwidth sufficiently great to reproduce heterodyne waves for the lines equal to their frequency differences. A plurality of bandpass filters each provided with output sensors are coupled to the output of the detector and tuned to separate the heterodyne waves so produced. The gaseous sample is normally installed in the delayed path.

The frequency modulation is preferably performed by a movable mirror driven piezoelectrically and defining one end wall of the optical cavity. The foregoing arrangement permits simultaneous readings to be taken on each line of the spectrum of the noble gas laser for which a filter and output sensor has been provided.

BRIEF DESCRIPTION OF THE DRAWING

The novel and distinctive features of the invention are set forth in the claims appended to the present application. The invention itself, however, together with further objects and advantages thereof, may be best understood by reference to the following description and accompanying drawings in which:

Figure 1:
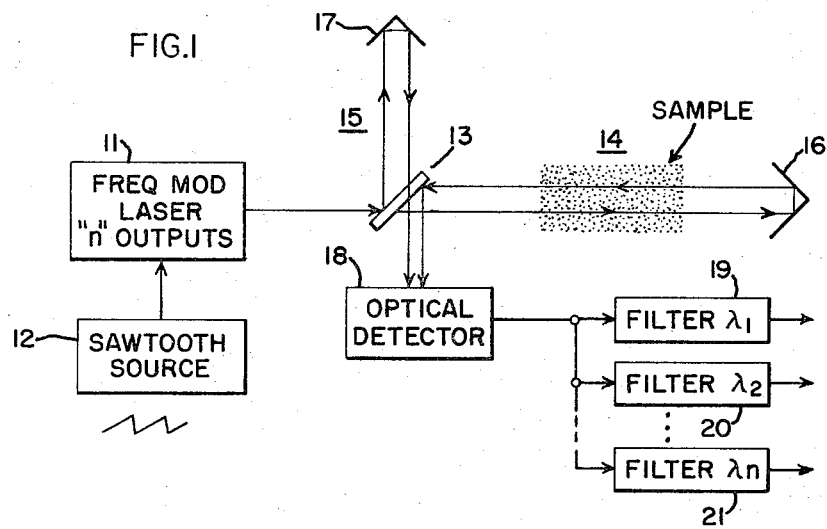
FIG. 1 is an illustration in simplified block diagram form of a heterodyne laser absorption spectrometer in accordance with the invention.
Figure 2:
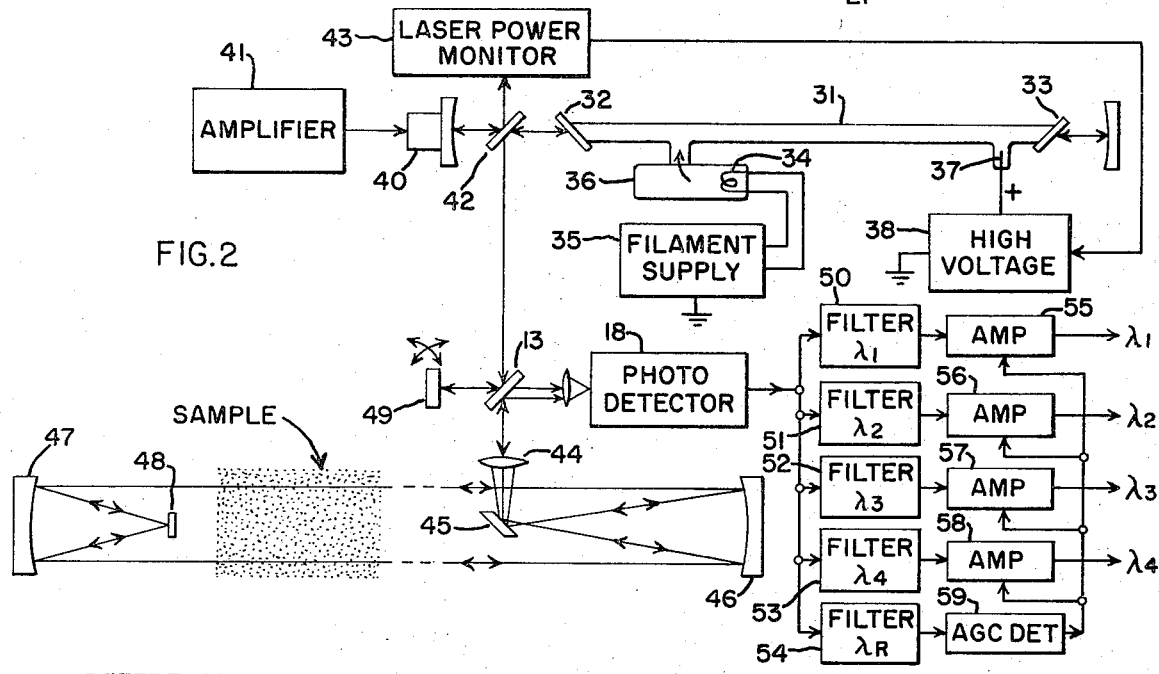
FIG. 2 is a more detailed block diagram of the same absorption spectrometer.

A heterodyne laser absorption spectrometer in accordance with the invention is shown in FIGS. 1 and 2. It is a high resolution device which produces an electrical output indicative of the infrared absorption of a gaseous sample at a plurality of wavelengths. The absorption spectrum is then used to identify the sample. In practical applications, the spectrometer herein described is capable of a spectral resolution substantially exceeding the one-quarter wave number ($\frac{1}{4}$ cm$^{-1}$) available from other techniques. An improvement of about seven orders of magnitude in spectral resolution (i.e., approximately $\frac{1}{8} \times 10^{-7}$ cm$^{-1}$ wave number) is typical. This high degree of resolution is desirable in spectrometric apparatus. It is useful in identifying trace quantities of gaseous materials as, for instance, in identifying gaseous air pollutants in parts per million.

FIG. 1 is a simplified block diagram of the spectrometer. The spectrometer has as its principal components a frequency modulated laser 11 having N simultaneous output frequencies, a source 12 of a sawtooth modulating voltage, a beam splitter 13 for separating the laser output into an analytical path into which a gas sample may be disposed and into a reference path 15, a retroreflector 16 for bounding the analytical path, a reflector 17 for bounding the reference path, and an optical heterodyne frequency detector 18 upon which light pursuing the two paths jointly impinges. The optical heterodynes produced by the detector 18 are coupled to electrical filters 19, 20 and 21, which separate the heterodyne for each laser line, line by line, and permit the absorption of each line to be separately measured.

Figure 5:
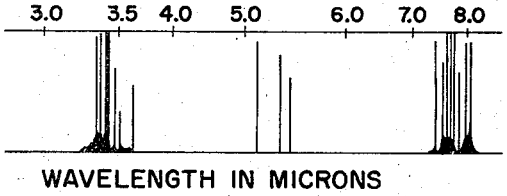
FIG. 5 is a graph of the principal spectral lines of a helium neon laser in the 3 to 8 micron, infrared region.

With reference to the simplified drawing of FIG. 1, a summary review of the operation of the spectrometer will be undertaken. The frequency modulated laser 11 has N simultaneous outputs in the three to 8 micron infrared spectrum. The spectrum of a helium neon "noble" gas laser suitable for this application is illustrated in FIG. 5. Gas lasers using other noble gases (including helium) are also suitable since they are all capable of simultaneous operation on a plurality of optical frequencies. In addition to supporting simultaneous optical outputs, the laser 15 must be capable of being frequency modulated. Individual lines of gas lasers are normally sufficiently Doppler broadened (approximately ~10$^{-8}$ cm$^{-1}$ wave number) such that the optically resonant cavity associated with the laser may support a small number (typically <10) of optical modes within the same broadened line). If the optical dimensions of the cavity are varied, "mode" pulling, i.e., a frequency shift of the individual resonances within a broadened line may be achieved. Assuming a Doppler broadened bandwidth of 300 MHz, and an interval of 60 MHz between optical modes, five lasing modes may be permitted, and each may be "pulled" nearly 30 MHz in a linear and unambiguous fashion. A sawtooth modulation voltage for achieving mode pulling and having a low frequency (1 KHz – 10 Hz) repetition rate is coupled from the sawtooth source 12 to the frequency modulated laser 11. The source 12 applies a waveform which varies in a sawtooth manner as a linear function of time so as to cause a similarly linear sawtooth displacement of each of the lines of the laser. Since the amount of mode pulling for a given dimensional excursion of the optical cavity is dependent upon the wavelength of the line in question, the actual frequency displacement is different for each of the displaced lines, being greater for higher frequency lines. Momentarily deferring a consideration of how this frequency displacement is produced, its utilization for achieving high spectral resolution by the heterodyne process will be described with continuing reference to FIG. 1.

The optical paths of FIG. 1, in accordance with the invention, facilitate production of an optical heterodyne by separating and then re-combining differentially delayed portions of the laser output. The optical output of the laser takes the form of a highly directional beam. The beam splitter 13, which intercepts the laser beam, divides the beam into two portions. An undeflected portion pursues the analytical path 14 at the end of which the retroreflector is arranged. Typically, the analytical path is in excess of 100 feet and often as much as several miles in length. The retroreflector 16 returns the analytic beam back to the reverse surface of the beam splitter 13, where a portion of the return analytic beam is deflected into the optical detector 18. The second portion of the laser output, which was initially incident upon the beam splitter 13 is deflected into a reference path 15 at the end of which a reference reflector 17 is disposed. The reference reflector 17 reflects the reference beam back through the beam splitter, where the undeflected portion impinges upon the optical detector 18. Thus, portions of both laser beams initially separated by the beam splitter 13 arrive at the optical detector 18 by paths of differing lengths and are recombined. The recombination of these two waves at an optical detector of suitable nonlinearity and bandwidth gives rise to comparatively low frequency heterodyne terms of medium radio frequencies.

Optically heterodyning the frequency modulated reference beam with the analytic beam magnifies small differences in frequency between individual lines in the spectrum of these beams, and facilitates the separation of each line in the spectrometer output by electric filters. With lines accurately separated, a very precise measure of their selective absorption in a gaseous medium may be obtained, and the measured selective absorption can then be used to identify the gaseous medium with heightened accuracy.

Figure 3:
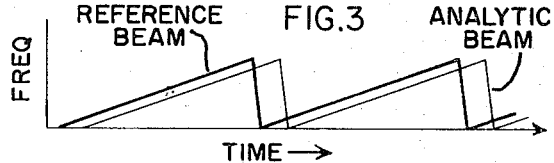
FIG. 3 is a graph of the optical frequency of one line of the laser of the spectrometer as it is subjected to "sawtooth" frequency modulation.
Figure 4:
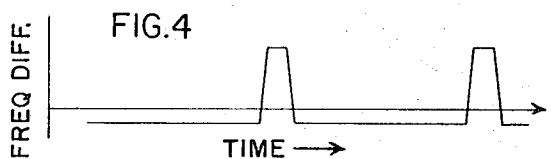
FIG. 4 is a graph of the difference in frequency of one laser line in the frequency modulated reference and analytic beams at the photodetector of the spectrometer.

In FIGS. 3 and 4, the frequency relationships for a single line in the laser beam are shown graphically. In FIG. 3, the heavy line denotes a line in the reference beam and the lighter line denotes a line in the analytic beam. In FIG. 3, the instantaneous frequency of the line is seen to vary in a sawtooth manner. Since both the analytic and reference paths contain a similarly varying wave, when they are combined with a mutual delay at a given point in space, except for two intersections, they will have differing instantaneous frequencies. Throughout most of the rising portion of the reference beam characteristic, the line in the analytic beam is at a lower frequency than the line in the reference beam. (Conversely, when the characteristic of the reference beam is falling, the line in the analytic beam may be momentarily at a higher frequency than the line in the reference beam.) The difference in frequency during the rising portions of the characteristic will be increased if the round trip time delay between the beams is increased. This may be graphically demonstrated by noting that an increase in the analytic path length will displace the graph of the instantaneous frequency of the analytic line to the right with respect to the reference line and cause an increase in the vertical separation or frequency difference between them. Similarly, if the slope of the characteristic is increased, the frequency difference between the two lines for a given time delay will also increase.

As shown in FIG. 4, the difference frequency created for a given line at the detector 18 will generally be of constant frequency. Since the frequency modulation is purposefully linear, constant frequency differences will be produced throughout the time that the frequencies of both the analytic and the reference beam are rising at the same rate. During the falling portion of the reference sawtooth waveform, the analytic waveform may continue to rise after the reference waveform has started to fall so that a constant frequency difference may not be produced during much of this period. When a constant value is reached, it is of higher frequency than before. Accordingly, difference terms developed during the retrace period are normally discarded in the detector output by suitable gates or filters.

Finally, the frequency dispersion between individual spectral lines arises because the frequency of each line is "pulled" in proportion to its optical frequency in the frequency modulation process. Assuming that in the modulation process the optical cavity is lengthened by an arbitrary amount required to produce a quarter wavelength shift in a 3.45 micron line and that it "pulls" the frequency 30 MHz, the same arbitrary lengthening will produce only an eighth wavelength shift in a hypothetical 6.9 micron line of double the wavelength. The corresponding frequency shift would be one-half of 30 MHz, i.e., 15 MHz.

Having selected a suitable difference in length between the reference and analytical paths, and a suitable slope to the sawtooth modulation characteristic, the heterodyne frequency of a given line may be established at a radio frequency convenient for electrical filtering. Since the frequency difference varies for each line, the systems constants are selected to permit resolution of the smallest optical frequency difference of the lowest frequency line pair that is of concern in the spectral analysis process.

The spectrometer of FIG. 1 is completed by the photodetector 18 upon which the analytic and reference beams impinge and whose electrical output is coupled to the electrical filters 19, 20 and 21. The photodetector is a nonlinear device, typically a semiconductor diode, which produces heterodyne terms in the form of electrical output signals when optical signals of suitably differing optical frequencies impinge on it. When suitable conditions occur, frequency difference terms corresponding to each of the spectral lines, give to electrical output signals of medium electrical frequencies. Each line producing a heterodyne term of different frequency, the electrical signals corresponding to each line are then separated from one another by suitably tuned electrical filters 19, 20 and 21 coupled to the detector output.

The photodetector 18 is a sensitive device, normally operating in a square law mode and producing a very substantial conversion gain. Assuming a very high level of reference optical input in relation to the return analytical signal, which is often the case, a very feeble analytical signal return may produce an electrical heterodyne term $10^3$ to $10^4$ times as large.

The spectrometer of FIG. 1 is depicted in greater detail in FIG. 4. The frequency modulated laser 11 includes an electron pumped noble gas laser tube 31 installed in an optical cavity, having one end wall which is driven by a piezoelectric driver.

The electron pumping is conventional. Electrons are thermionically emitted by the filament 34, which is situated in a gas reservoir 36. An anode 37 is disposed at the other end of the laser tube in a branch connected to the bore. A low voltage filamentary supply is shown at 35 suitable for raising the filament 34 to thermionic emission temperature. (One could also employ a cold cathode.) The filamentary supply is maintained at near ground potential. The anode 37 is coupled to a 2–4 KV positive high voltage supply 38. Electrons emitted by the filament are accelerated down the bore of the laser tube under the influence of the large electrical field maintained between the filament and the anode. The anode current is normally maintained within the range of from 20 to 100 milliamperes and is normally regulated to stabilize the laser output. Electron impacts with the gas contained within the bore excite the gas into high energy levels, and "pump" the laser.

The frequency modulation of the laser output is performed in an optically efficient manner. The laser tube 31 is shown with Brewster windows 32, 33 at each end of the bore permitting efficient optical coupling into and out of the tube with a minimum of loss. The optical cavity in which the laser tube is placed is defined at one end by a stationary mirror 39 and at the other end by a piezoelectrically driven mirror 40, driven by the amplifier 41. The bore of the tube is designed to minimize lateral radiation loss and the Brewster windows at each end of the tube are designed to minimize axial reflectance losses. The optical cavity is typically 100 inches long so that a mirror travel of one-quarter wavelength will produce a frequency shift of 60 MHz for a 3.45 micron line. The mirror, whose motion produces frequency modulation, is a particularly efficient means of achieving such modulation, because it requires the presence of no additional loss elements in the laser optical cavity.

The laser output is derived by a beam splitter 42 inserted into the optical cavity. The output is divided into the analytic and reference beams by the beam splitter 13. The beam splitter 42 produces a first deflected output orthogonal to the axis of the laser tube, which impinges upon the laser power monitor 43. The monitor is connected to the high voltage source powering the laser, and stabilizes the output by adjusting the electron current. An oppositely deflected beam from the beam splitter 42 passes through the beam splitter 13, where the undeflected portion becomes the analytic beam and the deflected portion becomes the reference beam.

The analytic beam upon its separation at the beam splitter 13 takes a path leading back and forth through the sample. Upon leaving the splitter 13, the beam impinges upon a focusing lens 44 which converges the beam upon the obliquely oriented mirror 45, and reflects the beam to a large parabolic mirror 46. The parabolic mirror 46 is of from 5 inches to 12 inches in diameter for atmospheric applications. It directs the analytical beam through the gaseous medium being analyzed and toward a parabolic reflector 47. The reflector 47 focuses the outgoing analytic beam upon a flat mirror 48 and then reflects a return beam back through the gaseous medium to the parabolic reflector 46. The return analytic beam is then focused by the reflector onto the oblique mirror 45. The return beam passes through the lens 44 and impinges on the back surface of the beam splitter 13. A portion of the return beam is then directed into the heterodyne detector 18. The analytical path, which has just been described, is of substantial length and produces a very substantial time delay in respect to the reference path.

The reference path is normally short. The reference path is also created by the beam splitter 13, which deflects a portion of the laser beam upon the adjustable mirror 49. The mirror 49 then reflects a portion of the reference beam back through the beam splitter, where it impinges together with the analytic beam on the heterodyne detector 18. Thus, both the reference and return beam are superimposed in the heterodyne detector. The mirror 49 is designed so as to adjust both the curvature and the orientation of the wavefronts of the reference beam into coincidence with the returning analytic beam.

The optical heterodyne detector 18 is a semiconductor IR detector operating on the square law principle, and having adequate bandwidth to demodulate the heterodyne terms which are produced. A suitable detector material is indium arsenide. Indium arsenide detectors are available having time constants of less than one microsecond. Faster detectors are available having time constants of a few nanoseconds, permitting operation up to several hundred megahertz.

The heterodyne output frequencies should be chosen for convenience in application. Assuming that the application is to air pollution monitoring, certain typical design parameters may be indicated. A cavity length of 100 inches produces a frequency shift of 60 MHz for one-half wavelength mirror displacement. To avoid nonlinearity, the scanning is normally limited to one-quarter wavelength (during a round trip delay time). Such a displacement produces a maximum shift of 30 MHz. Four of the most common air pollutants have strong absorptions at the following wavelengths:

| Wavelength (microns) | Pollutant |
|---|---|
| $\lambda_1 = 3.45$ | $NO_2$ |
| $\lambda_2 = 4.60$ | $CO$ |
| $\lambda_3 = 5.4$ | $NO$ |
| $\lambda_4 = 7.43$ | $SO_2$ |

With a one-quarter wavelength mirror travel (at 3.45 microns), the HeNe laser would produce the following total frequency shift for each wavelength.

$$\Delta F(\lambda_1) = 30 \text{ MHz}$$

then $$\Delta F(\lambda_2) = (\lambda_1/\lambda_2) \, 30 \text{ MHz} = 22.59 \text{ MHz}$$

$$\Delta F(\lambda_3) = (\lambda_1/\lambda_3) \, 30 \text{ MHz} = 19.15 \text{ MHz}$$

$$\Delta F(\lambda_4) = (\lambda_1/\lambda_4) \, 30 \text{ MHz} = 13.92 \text{ MHz}$$

(The shorter wavelength line produces the highest frequency shift.)

Using a sawtooth frequency scan of 1 KHz and a 10 microsecond round trip time, the actual frequency difference on heterodyning becomes one one-hundredth of the total frequency scan. The corresponding heterodyne frequencies (HF) under the above conditions are as follows:

$$HF \, \lambda_1 = 300 \text{ KHz/mile R.T.}$$

$$HF \, \lambda_2 = 225 \text{ KHz/mile R.T.}$$

$$HF \, \lambda_3 = 191.5 \text{ KHz/mile R.T.}$$

$$HF \, \lambda_4 = 139.2 \text{ KHz/mile R.T.}$$

The filters coupled to the output of the heterodyne detector 18 are shown at 50, 51, 52, 53 and 54. The filters 50 to 53 are set to wavelengths useful in characterizing the expected unknowns, while the filter 54 is set to a "neutral" wavelength. The outputs of the filters 50 to 53 are coupled to automatic gain controlled amplifiers 55, 56, 57 and 58 and their stabilized outputs go to a data processor (not illustrated) for performance of the gas analysis process. The output of the filter 54, which is set to a neutral wavelength, is coupled to the AGC detector 59. The AGC detector 59 derives an electrical measure of the average level of the analytic return signal after its attenuation by passage through the sample from this neutral wavelength. The neutral wavelength is typically a spectral line that is not selectively absorbed by any of the expected gaseous unknowns. In some applications plural neutral wavelengths may be employed. The measurement of signal strength derived from the neutral wavelength is then compared to an internal standard in the AGC detector and any "error" signal is used to adjust the gain of all the AGC amplifiers 55-58 by an equal amount to bring the output level to the desired standardized value.

As earlier noted, the laser power output is monitored by the laser power monitor 43 which directly stabilizes the output of the laser by anode current control. In the event that there is still some instability in the laser output, an AGC detector using an internal standard, such as that herein described, will remove much of it. Should the AGC detector not contain an internal standard, the laser power monitor should be sufficiently effective to avoid causing error in the output reading.

What we claim as new and desire to secure by Letters Patent of the United States is:

1. A laser absorption spectrometer comprising:
   a. a laser for producing an output beam having:
      1. a gaseous medium capable of simultaneous optical amplification at a plurality of optical frequencies, each line being subject to Doppler broadening, 2. an optically resonant cavity, optically coupled to said gaseous medium and supporting multimode operation within said broadened line, and
3. means for frequency modulating the optical output of said laser in a linear sawtooth manner to displace the frequency of each laser line by an amount inversely proportional to its wavelength by changing the resonant frequency of said optical cavity to produce mode pulling,
b. means to separate the output beam of said laser into a first and a second beam pursuing separate paths and to recombine said first and second beams with a fixed mutual time delay sufficient to produce electrically resolvable frequency differences for individual lines,
c. an optical detector upon which said mutually delayed beams impinge having a bandwidth sufficiently great to reproduce heterodyne waves equal to said frequency differences,
d. a plurality of bandpass filters coupled to the output of said detector tuned to separate the heterodyne waves produced, and
e. means coupled to the output of each bandpass filter for sensing the intensity of each of said heterodynes.

2. The combination set forth in claim 1 wherein a gaseous sample is introduced into one of said paths to sense its absorption at said plurality of optical frequencies.

3. The combination set forth in claim 1 wherein said frequency modulating means comprises a movable defining one end wall of the laser optical cavity.

* * * * *